US008725626B2

(12) United States Patent
Nystrom et al.

(10) Patent No.: US 8,725,626 B2
(45) Date of Patent: May 13, 2014

(54) METHOD, DEVICE AND SYSTEM FOR AUTOMATED CONTEXT INFORMATION BASED SELECTIVE DATA PROVISION BY IDENTIFICATION MEANS

(75) Inventors: Sebastian Nystrom, Espoo (FI); Carmen Kuhl, Dortmund (DE)

(73) Assignee: Nokia Corporation, Espoo (FI)

( * ) Notice: Subject to any disclaimer, the term of this patent is extended or adjusted under 35 U.S.C. 154(b) by 1911 days.

(21) Appl. No.: 10/586,771

(22) PCT Filed: Jan. 23, 2004

(86) PCT No.: PCT/IB2004/000161
§ 371 (c)(1),
(2), (4) Date: May 10, 2007

(87) PCT Pub. No.: WO2005/081183
PCT Pub. Date: Sep. 1, 2005

(65) Prior Publication Data
US 2007/0236350 A1    Oct. 11, 2007

(51) Int. Cl.
*G06Q 40/00* (2012.01)
(52) U.S. Cl.
USPC .............................................. 705/38; 705/35
(58) Field of Classification Search
USPC ........................................................ 705/38
See application file for complete search history.

(56) References Cited

U.S. PATENT DOCUMENTS

| | | | |
|---|---|---|---|
| 4,599,490 A | 7/1986 | Cornell et al. | |
| 4,698,781 A | 10/1987 | Cockerell, Jr. | |
| 4,821,309 A | 4/1989 | Namekawa | |
| 5,138,329 A | 8/1992 | Saarnimo et al. | |
| 5,345,596 A | 9/1994 | Buchenhorner et al. | |
| 5,497,140 A | 3/1996 | Tuttle | |
| 5,525,994 A | 6/1996 | Hurta et al. | |
| 5,577,266 A | 11/1996 | Takahisa et al. | |
| 5,625,669 A | 4/1997 | McGregor et al. | |
| 5,627,517 A | 5/1997 | Theimer et al. | |
| 5,729,594 A | 3/1998 | Klingman | |
| 5,815,811 A | 9/1998 | Pinard et al. | |
| 5,887,253 A | 3/1999 | O'Neil et al. | |

(Continued)

FOREIGN PATENT DOCUMENTS

| CN | 1027611 C | 2/1995 |
|---|---|---|
| CN | 1260939 | 7/2000 |

(Continued)

OTHER PUBLICATIONS

Bisdikian, C., "An Overview of the Bluetooth Wireless Technology", IEEE Communications Magazine, Dec. 2001, pp. 86-94.

(Continued)

*Primary Examiner* — Kirsten Apple
(74) *Attorney, Agent, or Firm* — Locke Lord LLP

(57) ABSTRACT

The present invention relates to a method, a device and a system supporting an automated selection of data records for being provided by an identification means. The data records comprising payment and electronic ticket related information. Obtained context information allow for selecting automatically one suitable data record out of said plurality of data records to be provided by the identification means, which operated for example as a radio frequency identification (RFID) transponder to an external identification means, which operated for example as a radio frequency reader (RFID) implemented for instance in a point of sales, a cash box and/or a ticket checkpoint.

19 Claims, 4 Drawing Sheets

(56) References Cited

U.S. PATENT DOCUMENTS

| | | | |
|---|---|---|---|
| 5,898,679 A | 4/1999 | Brederveld et al. |
| 5,903,830 A | 5/1999 | Joao et al. |
| 5,917,865 A | 6/1999 | Kopmeiners et al. |
| 5,917,913 A | 6/1999 | Wang |
| 5,943,624 A | 8/1999 | Fox et al. |
| 6,002,984 A | 12/1999 | Aughenbaugh |
| 6,011,976 A | 1/2000 | Michaels et al. |
| 6,101,375 A | 8/2000 | Tuttle et al. |
| 6,104,290 A | 8/2000 | Naguleswaran |
| 6,104,333 A | 8/2000 | Wood, Jr. |
| 6,115,782 A | 9/2000 | Wolczko et al. |
| 6,130,623 A | 10/2000 | Maclellan |
| 6,144,847 A | 11/2000 | Atschul et al. |
| 6,144,848 A | 11/2000 | Walsh et al. |
| 6,167,514 A | 12/2000 | Matsui et al. |
| 6,175,860 B1 | 1/2001 | Gaucher |
| 6,175,922 B1 | 1/2001 | Wang |
| 6,236,186 B1 | 5/2001 | Helton et al. |
| 6,282,407 B1 | 8/2001 | Vega et al. |
| 6,297,737 B1 | 10/2001 | Irvin |
| 6,337,856 B1 | 1/2002 | Schanhals et al. |
| 6,382,507 B2 | 5/2002 | Schilling |
| 6,404,339 B1 | 6/2002 | Eberhardt |
| 6,422,462 B1 | 7/2002 | Cohen |
| 6,424,623 B1 | 7/2002 | Borgstahl et al. |
| 6,424,706 B1 | 7/2002 | Katz et al. |
| 6,434,159 B1 | 8/2002 | Woodward et al. |
| 6,445,732 B1 | 9/2002 | Beamish et al. |
| 6,456,039 B1 | 9/2002 | Lauper et al. |
| 6,456,234 B1 | 9/2002 | Johnson |
| 6,462,647 B1 | 10/2002 | Roz |
| 6,483,106 B1 | 11/2002 | Ohtomo et al. |
| 6,487,180 B1 | 11/2002 | Borgstahl et al. |
| 6,488,209 B1 | 12/2002 | Hunt et al. |
| 6,501,741 B1 | 12/2002 | Mikkonen et al. |
| 6,512,919 B2 | 1/2003 | Ogasawara |
| 6,539,422 B1 | 3/2003 | Hunt et al. |
| 6,542,721 B2 | 4/2003 | Boesen |
| 6,566,997 B1 | 5/2003 | Bradin |
| 6,634,560 B1 | 10/2003 | Grabau |
| 6,663,063 B2 | 12/2003 | Tatta |
| 6,677,852 B1 | 1/2004 | Landt |
| 6,681,120 B1 | 1/2004 | Kim |
| 6,687,679 B1 | 2/2004 | Van Luchene et al. |
| 6,690,402 B1 | 2/2004 | Waller et al. |
| 6,697,375 B1 | 2/2004 | Meng |
| 6,705,520 B1 | 3/2004 | Pitroda et al. |
| 6,710,576 B1 | 3/2004 | Kaufman et al. |
| 6,732,176 B1 | 5/2004 | Stewart et al. |
| 6,783,071 B2 | 8/2004 | Levine et al. |
| 6,792,292 B1 | 9/2004 | Chatani |
| 6,832,082 B1 | 12/2004 | Ramaswamy et al. |
| 6,842,621 B2 | 1/2005 | Labun et al. |
| 6,892,052 B2 | 5/2005 | Kotola et al. |
| 6,892,082 B2 | 5/2005 | Boesen |
| 6,989,741 B2 | 1/2006 | Kenny et al. |
| 7,020,474 B2 | 3/2006 | Scott |
| 7,039,600 B1 | 5/2006 | Meek et al. |
| 7,049,963 B2 | 5/2006 | Waterhouse et al. |
| 7,098,770 B2 | 8/2006 | Charrat et al. |
| 7,152,040 B1 | 12/2006 | Hawthorne et al. |
| 7,174,564 B1 | 2/2007 | Weatherspoon et al. |
| 7,190,257 B2 | 3/2007 | Maltseff et al. |
| 7,231,372 B1 | 6/2007 | Prange et al. |
| 7,433,677 B2 | 10/2008 | Kantola et al. |
| 7,565,108 B2 | 7/2009 | Kotola et al. |
| 7,657,490 B1 | 2/2010 | Nakajima |
| 7,933,589 B1 | 4/2011 | Mamdani et al. |
| 8,233,881 B2 | 7/2012 | Kantola et al. |
| 2001/0007815 A1 | 7/2001 | Philipsson |
| 2001/0046862 A1 | 11/2001 | Coppinger et al. |
| 2001/0051915 A1 | 12/2001 | Ueno et al. |
| 2002/0011519 A1 | 1/2002 | Shults, III |
| 2002/0020743 A1 | 2/2002 | Sugukawa et al. |
| 2002/0022483 A1 | 2/2002 | Thompson et al. |
| 2002/0022504 A1 | 2/2002 | Horii |
| 2002/0023215 A1 | 2/2002 | Wang et al. |
| 2002/0026586 A1 | 2/2002 | Ito |
| 2002/0065065 A1 | 5/2002 | Lunsford et al. |
| 2002/0106988 A1 | 8/2002 | Davie et al. |
| 2002/0107742 A1 | 8/2002 | Magill |
| 2002/0145039 A1 | 10/2002 | Carroll |
| 2002/0154607 A1 | 10/2002 | Forstadius et al. |
| 2002/0164994 A1 | 11/2002 | Lundberg |
| 2002/0170961 A1 | 11/2002 | Dickson et al. |
| 2002/0188863 A1 | 12/2002 | Friedman |
| 2003/0008647 A1 | 1/2003 | Takatori et al. |
| 2003/0030542 A1 | 2/2003 | Von Hoffmann |
| 2003/0051767 A1 | 3/2003 | Coccaro et al. |
| 2003/0051945 A1 | 3/2003 | Coccaro et al. |
| 2003/0055735 A1 | 3/2003 | Cameron et al. |
| 2003/0093187 A1 | 5/2003 | Walker |
| 2003/0114104 A1 | 6/2003 | Want et al. |
| 2003/0141989 A1 | 7/2003 | Arisawa et al. |
| 2003/0146821 A1 | 8/2003 | Brandt |
| 2003/0148775 A1 | 8/2003 | Spriestersbach et al. |
| 2004/0002305 A1 | 1/2004 | Byman-Kivivuori et al. |
| 2004/0012531 A1 | 1/2004 | Toda |
| 2004/0039661 A1* | 2/2004 | Fuzell-Casey et al. ......... 705/27 |
| 2004/0099070 A1 | 5/2004 | Waters |
| 2004/0164166 A1 | 8/2004 | Mahany et al. |
| 2005/0017068 A1 | 1/2005 | Zalewski et al. |
| 2005/0026635 A2 | 2/2005 | Michaels et al. |
| 2005/0034029 A1 | 2/2005 | Ramberg et al. |
| 2005/0037707 A1 | 2/2005 | Lewis |
| 2005/0040951 A1 | 2/2005 | Zalewski et al. |
| 2005/0077356 A1 | 4/2005 | Takayama et al. |
| 2005/0079817 A1 | 4/2005 | Kotola et al. |
| 2005/0134461 A1 | 6/2005 | Gelbman et al. |
| 2005/0136949 A1 | 6/2005 | Barnes, Jr. |
| 2005/0218230 A1 | 10/2005 | Amtmann et al. |
| 2005/0237843 A1 | 10/2005 | Hyde |
| 2005/0269411 A1 | 12/2005 | Vesikivi et al. |
| 2006/0132310 A1 | 6/2006 | Cox et al. |
| 2006/0145865 A1 | 7/2006 | Forster |
| 2006/0168644 A1 | 7/2006 | Richter et al. |
| 2006/0244592 A1 | 11/2006 | Kansala et al. |
| 2007/0063816 A1 | 3/2007 | Murakami et al. |
| 2007/0236350 A1 | 10/2007 | Nystrom et al. |
| 2008/0057867 A1 | 3/2008 | Trappeniers et al. |
| 2008/0231428 A1 | 9/2008 | Kuhl |
| 2008/0238617 A1 | 10/2008 | Kuhl et al. |
| 2009/0058618 A1 | 3/2009 | Gopalan et al. |

FOREIGN PATENT DOCUMENTS

| | | |
|---|---|---|
| CN | 1643806 | 7/2005 |
| DE | 10042805 | 3/2002 |
| EP | 0780802 | 6/1997 |
| EP | 0926623 | 6/1999 |
| EP | 1178445 | 2/2002 |
| EP | 1182833 | 2/2002 |
| EP | 1330075 | 9/2002 |
| EP | 1012793 | 4/2003 |
| EP | 1545069 | 6/2005 |
| EP | 1633104 | 8/2006 |
| EP | 1522955 | 8/2008 |
| EP | 1725977 | 4/2009 |
| GB | 2308947 | 9/1997 |
| GB | 2342010 | 3/2000 |
| GB | 2364457 | 1/2002 |
| JP | 09172409 | 6/1997 |
| JP | 2002058066 | 2/2002 |
| JP | 2002063652 | 2/2002 |
| JP | 2002-271850 | 9/2002 |
| JP | 2005-218127 | 8/2005 |
| JP | 2006-525580 | 11/2006 |
| WO | WO9300750 | 1/1993 |
| WO | WO9806214 | 2/1998 |
| WO | WO9858510 | 12/1998 |
| WO | WO9905659 | 2/1999 |
| WO | WO0065747 | 11/2000 |
| WO | WO0103311 | 1/2001 |
| WO | WO0139103 | 5/2001 |

(56) References Cited

FOREIGN PATENT DOCUMENTS

| WO | WO0139108 | 5/2001 |
|---|---|---|
| WO | WO0145038 | 6/2001 |
| WO | WO0145319 | 6/2001 |
| WO | WO0180193 | 10/2001 |
| WO | WO0203625 | 1/2002 |
| WO | WO02071325 | 9/2002 |
| WO | 02099715 A1 | 12/2002 |
| WO | WO02099715 | 12/2002 |
| WO | WO03007623 | 1/2003 |
| WO | WO03025834 | 3/2003 |
| WO | WO03079281 | 9/2003 |
| WO | WO03081519 | 10/2003 |
| WO | WO03081787 | 10/2003 |
| WO | WO2004098089 | 11/2004 |
| WO | WO2004110017 | 12/2004 |
| WO | WO2008024531 | 2/2008 |

OTHER PUBLICATIONS

Zdravkovic, A., "Wireless Point of Sale Terminal for Credit and Debit Payment Systems", IEEE, 1988, pp. 890-893.

"Bluetooth Measurements in CMU200", Universal Radio Communication Tester CMU 200, pp. 30-33.

Skipper, J., "Electronic Banking and Payments", The Institution of Electrical Engineers, IEE, Savoy Place, London, 1998, 6 pages.

Inoue et al., "A Ferrorelectric Memory Embedded in a RFID Transponder with 2.4V Operation and 10 Year Retention at 70C", IEEE, 1997, pp. 290-291.

Haselsteiner et al., "Security in Near Field Communication (NFC)", http://events.iaik.tugraz.atIRFIDSec06/Program/papers/002%20-%20Securitry%20in%20NFC.pdf, copy downloaded from web Jul. 22, 2010.

European Extended Search Report dated Jan. 19, 2010 from European Patent Application No. 09164761.0, pp. 1-7.

European Search Report dated Jan. 30, 2007 from European Patent Application No. 03744931.1, pp. 1-3.

European Supplemental Search Report dated Feb. 20, 2008 from European Patent Application No. 05725885.7, pp. 1-3.

International Search Report and Written Opinion dated Oct. 22, 2004 from PCT App. No. PCT/IB2004/000784, pp. 1-4.

International Preliminary Report on Patentability dated Jun. 27, 2005 from PCT App. No. PCT/IB2003/002900, pp. 1-11.

International Search Report dated Feb. 11, 2004 from PCT App. No. PCT/IB2003/002900, 1 pg.

International Search Report and Written Opinion dated Aug. 11, 2006 from PCT App. No. PCT/US05/09066, pp. 1-13.

International Search Report dated Oct. 17, 2003 from PCT App. No. PCT/IB03/00897, 1 pg.

International Search Report dated Nov. 9, 2001 from PCT App. No. PCT/EP01/03950, 2 pgs.

International Preliminary Examination Report dated Sep. 23, 2002 from PCT App. No. PCT/EP01/03950, pp. 1-10.

Written Opinion dated Apr. 8, 2002 from PCT App. No. PCT/EP01/03950, pp. 1-2.

Detailed Written Opinion dated Jul. 16, 2002 from PCT App. No. PCT/EP01/03950, pp. 1-6.

International Preliminary Report on Patentabiilty dated Sep. 20, 2006 from PCT App. No. PCT/IB2004/000784, pp. 1-4.

\* cited by examiner

METHOD, DEVICE AND SYSTEM FOR AUTOMATED CONTEXT INFORMATION BASED SELECTIVE DATA PROVISION BY IDENTIFICATION MEANS

FIELD OF THE INVENTION

The present invention relates to an automated configuration of data provision. More particularly the present invention relates to context information based selective configuration of the data provision by an identification means operating as an identification transponder.

BACKGROUND OF THE INVENTION

Generally, the present invention addresses the field of local communication technology, such as those short-range communications technologies involving electromagnetic/electrostatic-coupling technology. In one embodiment, electromagnetic and/or electrostatic coupling is implemented in the radio frequency (RF) portion of the electromagnetic spectrum, using for example radio frequency identification (RFID) technology, which primarily includes radio frequency identification (RFID) transponders also denoted as radio frequency (RFID) tags and radio frequency transponder readers also denoted for simplicity as radio frequency (RFID) readers. In another embodiment, visual codes are employed for local communications between a visual encoding means, which is adapted to display bar codes, two-dimensional visual codes and the like, and a counterpart visual scanning means, which is adapted to detect and scan displayed visual codes from such a visual encoding means. The visual codes code information transformed according to a suitable algorithm to visual structures scannable by the visual scanning means. Both introduced embodiments address identification information technology, to which references will be given in the following.

Radio frequency identification (RFID) transponders are widely used for labeling objects, to establish person's identities and to recognize objects provided with radio frequency identification (RFID) transponders. Basically, radio frequency identification (RFID) transponders include an electronic circuit with data storage capacity and a radio frequency (RF) interface and high frequency (HF) interface, respectively, which couples an antenna to the electronic circuit. The radio frequency identification (RFID) transponders are typically accommodated in small containers. Depending on the requirements made on the deployment of the radio frequency identification (RFID) transponders (i.e. the data transmission rate, energy of the interrogation, transmission range etc.) different types are provided for data/information transmission on different radio frequencies within a range from several 10-100 kHz to some GHz (e.g. 134 kHz, 13.56 MHz, 860-928 MHz etc; only for illustration). Two main classes of radio frequency identification (RFID) transponders can be distinguished, i.e. passive radio frequency identification (RFID) transponders which are activated by radio frequency identification (RFID) transponder readers which generate an interrogation signal, for example a radio frequency (RF) signal at a certain frequency, and active radio frequency identification (RFID) transponders which comprise own power supplies such as batteries or accumulators for energizing.

Payment and ticket applications are considered as one of the most important emerging usage areas that will leverage in radio frequency identification (RFID) technology. For instance, a portable terminal such as a mobile phone implementing a radio frequency identification (RFID) transponder may be utilized to provide/present a digitally coded or electronic ticket, which has been obtained before, to a ticket checkpoint system of an entrance of a public transportation system. The digitally coded ticket is read out by a corresponding radio frequency identification (RFID) reader, with which the checkpoint system is equipped, and is analyzed thereby. In case of validity of the digitally coded ticket the access to the public transportation system is granted to the owner of the portable terminal. Advantageously, such a ticket checkpoint system may be available for public transportation systems in various cities, which may result in the requirement for coding different digitally coded tickets. Moreover the illustrated ticket checkpoint system may be extended to similar digitally coded records such as credit card information, loyalty card information, cinema tickets and the like, where the portable terminal performs information exchange with the very same equipment. The same applications may be realized by using visual codes presented by a visual encoding means and a visual scanning means allowing for reading-out the visual codes from the visual encoding means.

It is feasible to store said above illustrated data records in a data storage component, from which a required data record is retrieved on manual user input and provided for being presented via the identification means (i.e. the radio frequency identification (RFID) transponder and visual encoding means, respectively). Nevertheless, such manual handling operated by a user appears to the user as elaborate and clumsy, especially when considering that the number of data records may grow rapidly with the usage. Usability requires the implementation and realization of handling, which is understandable and acceptable by users. Each manual user interaction requires relative high effort and may not be feasible in various places and environments. On vendor side, the acceptance of users is often critical, since the implementation is cost intensive, especially when new technology such as identification technology based payment and/or access systems will have to be introduced. In principle, the better the usability the higher the acceptance of users such that the investment of capital into the new introduced technology amortizes within a satisfactory period of time.

SUMMARY OF THE INVENTION

An object of the present invention is to provide a method and device to automate at a large extent the provision of data records by an identification means by limiting the manual user interaction to the minimum required.

Another object of the present invention is to provide arrangements and systems, which allow performing above stated methodology.

The objects of the present invention are solved by context information based selective provision method for data record selection, which allows substantially automation of the selection operation without any user interaction.

Advantageously, the present invention provides a significant improvement in terms of user experience, as compared to solutions that would utilize a user interface requiring manual interaction of the user. Further, present invention eliminates the need for the end user to ever browse through a huge number of list entries, each entry relating to information about tickets, credit cards etc. stored inside the portable terminal. As a result, even large amounts of information become easily maintainable, encouraging end users to frequently use the portable terminal as the "ticket of choice" and "purse of choice", respectively. Further, there is no requirement for a user to actively perform actions for defining current context for providing input to select appropriate data to an identification means operating as identification transponder module.

According to a first aspect of the present invention, a method for automated context information based selective data provision for identification means is provided. Context information is acquired/retrieved wirelessly from an external source, i.e. via a wireless data link using any wireless acquisition technique. A plurality of data records is provided for being selected and a data record is then selected out of the plurality of data records on the basis of the context information. The selected data record is prepared for further processing, including suppliying of the selected data to the identification means, provision and/or presentation. Afterwards the selected data record is provided as an identification information by the identification means such that the selected data record can be retrieved wirelessly as the identification information of the identification means, i.e. via a wireless data link using any wireless acquisition technique.

According to an embodiment of the invention, an environment is scanned for detecting the external source.

According to another embodiment of the invention, the context information is analyzed in order to allow the selection of the data record out of the plurality of data records.

According to a further embodiment of the invention, the aforementioned analysis may comprise an extracting of one or more commands or an extracting of information items from the context information. The one or more extracted commands are dedicated to instruct the selection of one data record, which is exactly designated by the commands. The extracted information item may be compared with one or more data items, which comprised by the data records or the extracted information item may be compared with a set of association information. The selection is based on the comparison result produced by the comparison operation.

According to yet another embodiment of the invention, a data record of the plurality of data records relates to for instance payment related information, loyalty card related information, credit card related information, debit card information, prepaid card information, coupon information, voucher information and electronic ticket related information.

According to yet a further embodiment of the invention, the preparation comprises a configuration of the identification means with the selected data record. The selected data record may be supplied to the identification means.

According to an additional embodiment of the invention, the provision of the selected data record as the identification information is operable with a radio frequency identification means, from which the selected data record is retrievable wirelessly by a corresponding external counterpart identification means. The radio frequency identification means may be operable as a radio frequency identification (RFID) transponder, whereas the corresponding external counterpart identification means may be operable as a radio frequency identification (RFID) reader.

According to still another embodiment of the invention, revoking the provision of the selected data record is revoked in consequence of running down a predefined interval in time; exceeding a predefined moment in time; or detecting that said external counterpart identification means has retrieved said identification information representing said selected data record.

According to another embodiment of the invention, the identification means is operable with at least two operation modes including a reader mode and a transponder mode. The identification means operated in the reader mode corresponds to a radio frequency identification (RFID) reader, whereas the identification means operated in the transponder mode corresponds to a radio frequency identification (RFID) transponder. In particular, the identification means is operated in the reader mode for the acquisition of the context information; and the identification means is operated in the transponder mode for the provision of the selected data record. The switching between the reader mode and the transponder mode is performed automatically, especially in conjunction with the reparation of the selected data record for provision. The default operation mode of the identification means may be the reader mode, such that the operation mode of the identification means is switched to reader mode as soon as the provision is revoked.

According to a second aspect of the invention, computer program product for executing a method for automated context information based selective data provision for identification means is provided. The computer program product comprises program code sections for carrying out the steps of the method according to an aforementioned embodiment of the invention, when the program is run on a computer, a terminal, a network device, a mobile terminal, a mobile communication enabled terminal or an application specific integrated circuit. Alternatively, an application specific integrated circuit (ASIC) may implement one or more instructions that are adapted to realize the aforementioned steps of the method of an aforementioned embodiment of the invention, i.e. equivalent with the aforementioned computer program product.

According to a third aspect of the invention, a computer program product is provided, which comprises program code sections stored on a machine-readable medium for carrying out the steps of the method according to an aforementioned embodiment of the invention, when the computer program product is run on a computer, a terminal, a network device, a mobile terminal, or a mobile communication enabled terminal.

According to a fourth aspect of the invention, a software tool is provided. The software tool comprises program portions for carrying out the operations of the aforementioned methods when the software tool is implemented in a computer program and/or executed According to a fifth aspect of the invention, a computer data signal embodied in a carrier wave and representing instructions is provided which when executed by a processor cause the steps of the method according to an aforementioned embodiment of the invention to be carried out.

According to a sixth aspect of the present invention, a portable terminal, which enables for automated context information based selective data provision for identification means, is provided. The portable terminal comprises at least an acquisition means, a selection means and a configuration means. The acquisition means is adapted to acquire wirelessly context information from an external source. The selection means is adapted to select one data record out of a plurality of data records on the basis of the context information. The said plurality of data record is maintained by the portable terminal for being selected. The configuration means is adapted to prepare and supply the selected data record for provision. The identification means is adapted to provide the selected data record as an identification information for being wirelessly retrievable, especially adapted for presentation.

According to an embodiment of the invention, the identification means is coupled to the portable terminal at least for a time, i.e. either long lasting or only for (a) certain or predetermined or at least predeterminable period(s) of time. In particular, the identification means may be electrically or wirelessly coupled to the terminal device.

According to an embodiment of the invention, the acquisition means is adapted for scanning an environment for the external source.

According to another embodiment of the invention, the portable terminal comprises additionally an analysis means for analyzing the context information. Moreover, the analysis means comprises extraction means adapted for extracting one or more commands and/or for extracting an information item from said context information. The one or more commands refer to a data record such that the data record is selectable in conjunction with the commands. The information item is supplied to a comparison means, which is adapted for comparing the information item with data items comprised by the data records and/or with association information. The data record is selected on the basis of the comparison results.

According to yet another embodiment of the invention, the portable terminal comprises additionally revocation means adapted to revoke or reset the provision of the selected data record in consequence of a signal generated by at least one further means. The further means, which are suitable for generating such a signal, include a timer means and a detection means. The timer means is adapted to generate the signal in case a predefined interval in time has run down and/or in case a predefined moment in time has been exceeded. The detection means is adapted to generate the aforementioned signal in case it is detected that the external counterpart identification means has retrieved the identification information representing the selected data record.

According to embodiments of the invention, the identification means may be a radio frequency identification (RFID) means or may be a visual encoding means.

According to another embodiment of the invention, the identification means is operable with a reader mode and a transponder mode. The identification means is operable with the reader mode for acquiring context information and the identification means is operable with the transponder mode for providing the selected data record.

According to a seventh aspect of the present invention, a system for automated context information based selective data provision for identification means is provided. The system comprises a source providing context information, a counterpart identification means for acquiring identification information from said identification means and a portable terminal. The portable terminal comprises at least an acquisition means, a selection means and a configuration means. The acquisition means is adapted to wirelessly acquire context information from the external source. The selection means is adapted to select one data record out of a plurality of data records on the basis of the context information. The said plurality of data record is maintained by the portable terminal for being selected. The configuration means is adapted to prepare and supply the selected data record for provision. The identification means is adapted to provide the selected data record as the identification information for being wirelessly retrievable by the counterpart identification means.

According to an embodiment of the invention, the portable terminal is a mobile phone.

According to another embodiment of the invention, the counterpart identification means is comprised by a point of sales or a ticket checkpoint/gate entrance.

According to a further embodiment of the invention, the source is an identification means storing the context information.

BRIEF DESCRIPTION OF THE DRAWINGS

The accompanying drawings are included to provide a further understanding of the invention and are incorporated in and constitute a part of this specification. The drawings illustrate embodiments of the present invention and together with the description serve to explain the principles of the invention. In the drawings, FIG. 1 schematically illustrates a sequence diagram of the method for automated context information based selective data provision according to an embodiment of the invention.

DETAILED DESCRIPTION OF THE ILLUSTRATED EMBODIMENTS

Figure 1:
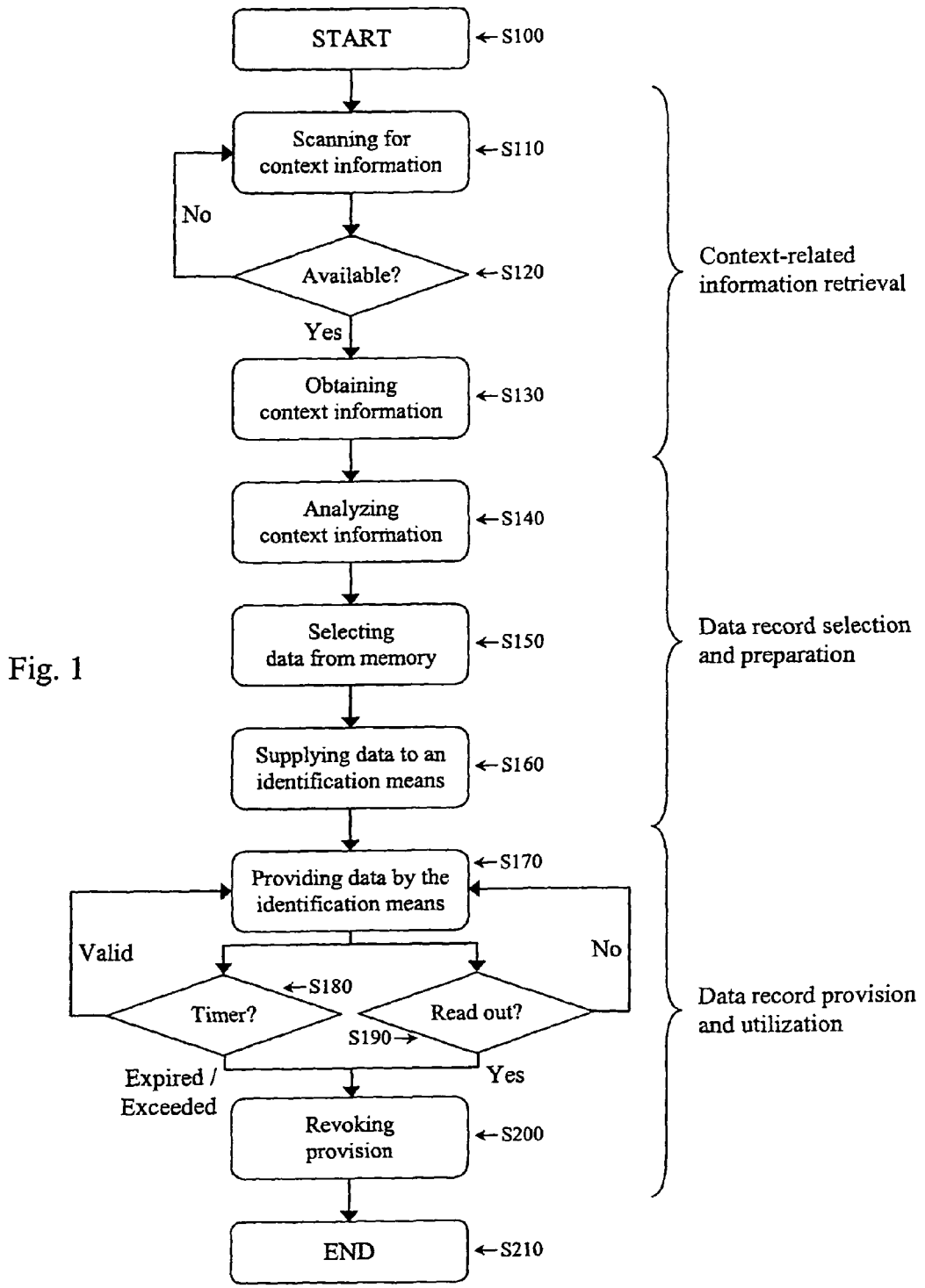

Reference will be made in detail to the embodiments of the invention examples of which are illustrated in the accompanying drawings. Wherever possible the same reference numbers are used in the drawings and the description to refer to the same or like parts.

The inventive methodology for automated context information based selective data provision of data representing a data record relating to payment information and/or ticket information will be described on the basis of a method according to an embodiment of the present invention. The data record relating to payment information shall be understood as information comprising digitally coded data in accordance with information about a credit card, a loyalty card, an electronic payment card, an electronic cash card, a debit card, a prepaid card, a coupon, a voucher, an Eurocheque card, a vendor-specific payment card and the like for being used by a customer in conjunction with the payment for commodities. The data record relating to ticket information shall be understood as information comprising digitally coded data concerning information about a ticket for accessing an event, an exhibition, a public transportation system, a cinema, a theatre, an opera, a concert and the like for being used at a checkpoint to authenticate access permission.

It shall be noted that the inventive methodology may be applied to any similar or related applications such as access control to hotel rooms, access control to rented cars, user control and user account management for libraries and the like. The number of similar or relates applications is high. A selection of example usage cases will be enlightened below.

FIG. 1 schematically illustrates a sequence diagram of the method for automated context information based selective data provision according to an embodiment of the invention. The starting point to enable performing the operational sequence illustrated herein, may be formed by a portable terminal including means for acquiring context information, a data storage storing a plurality of predefined data records, a processing means adapted to operate program code sections for carrying out aforementioned method and an identification means for provision of a selected data record to the outside.

In an operation S100, the method for automated context information based selective data provision starts.

For clarity, the method may be partitioned into three operational sections including retrieval of context-related information, preparation of data to be presented and provision/utilization of the prepared data. The partitions are selected for representing the basic operational features, wherein the combination of which results in the inventive automated context information based selective data provision.

The retrieval of context-related information will be described in detail but in an abstract form with respect to the following operations. In principle, the purpose of the inventive methodology is to select a data record from a plurality of data records, which are provided precedent for use. The provision of such data records is not part of the present invention. The data records are constituted of one or several data items.

To enlighten the contents of such data records, a data record relating to credit card information shall be mentioned for the way of illustration. Such a data record may comprise one or several data items including information about organization issuing the credit card, information about the holder of the credit card, information about the credit card identification number, information about the validity date, information about the expiration data, information about an associated bank, information for checking validly and the like. Further, a data record relating to loyalty card information may comprise illustratively one or several data items including information about the holder of the loyalty card, information about a loyalty card identification, information about discount level, information about goods and/or services preferred by the holder and the like. Furthermore, a data record relating to ticket information may comprise illustratively one or several data items including information about the purpose of the ticket, information about the validity in time of the ticket and the like.

In an operation S110, the environment is scanned for (externally provided) information being used as context-related information, on the basis of which automated selection of data for being provided may be operated. Suitable context-related information comprises several content types of information, which contents relate to different original purposes. Suitable context-related information might comprise at least location information, location-related information, location-based information and dedicated information, respectively.

The scanning operation should be understood as a passive scanning operation and an active scanning operation, respectively. During passive scanning, a context information acquisition means is adapted, configured or provided to obtain the context-related information, the supplying of which is initiated by an external source. That means that the context information acquisition means may be configured to be ready-to-receive context-related information. During active scanning, a context information acquisition means is adapted, configured or provided to actively obtain the context-related information by for instance active transmitting of one or more signals (e.g. interrogation signals), upon which initiates the supplying of the context-related information is operable.

In an operation S120, the scanning operation S110 is operated repeatedly, for example repeatedly at a predefined interval in time and/or for a predefined duration in time. It is check whether suitable context-based information is available. In case this applies, the operational sequence is continued with operation S130, otherwise the operational sequence returns back to the operation S110 for repeating the operation S110.

As aforementioned the returning back may include an interval of waiting and/or may be limited to predefined number of repetitions.

The location information and location-related information primarily code a geographical position or an indication of place of the user using the location service. The location-based information primarily codes information; which are obtained on the basis of a location information.

Location information and location-related information may be obtained via a cellular network implementing location service and location-based services, respectively. Alternatively, location information relating to a position information can also be obtained from global positioning system (GPS) signals received by a global positioning system (GPS) module. Such position information allows to identify a certain location e.g. a movie theater etc.

The dedicated information shall be understood as information, which refer to a predefined data record and which codes one or more instructions, in accordance with which the data record can be referenced.

In an operation S130, the context-related information is obtained or acquired. The scanning operation as well as the acquiring operation may be performed by the means of the information acquiring means.

Now the context-related information is available, with which the selection of one data record out of one or several of data records provided by the data storage for retrieval is operable. The preparation of data to be provided will be described in detail but in an abstract form with respect to the following operations.

In an operation S140, the obtained context-based information is analyzed. The analyzing operation depends and is based on the contents of the context-based information, which is obtained before. As aforementioned, the contents of the context-based information can differ significantly such that provisions may have been taken to enable the analyzing operation.

Referring back to the above illustrated examples referring to context-based information, the dedicated information comprising one or more instructions for referencing a predefined data record is analyzed to result in a decoding of the one or more instructions comprised. The location information, location-related information and location-based information are analyzed to result in an association information, by the means of which a data record is identifiable. The identification of the corresponding data record may be obtained by comparing the association information with a data item comprised in the data record in question or may be obtained by comparing the association information with a corresponding supplementary association information assigned to the data record in question.

The analyzing operation of the context-based information to enable identification of a data record in question will be more apparent with reference to use cases described below.

In an operation S150, a data record is selected from the plurality of data records being provided. The selecting operation is operable on the basis of the result of the analyzing operation performed before and the selected data record is provided for further handling.

In an operation S160, the selected data record is supplied to the identification means, i.e. the radio frequency identification (RFID) means, a visual encoding means etc, which is now prepared for providing the data comprised by the data record to allow an acquisition of the provided data by a corresponding counterpart entity. The supplying of the data record to the identification means effects that only this selected and supplied data record is transmittable by the identification means. The remaining data records are maintained for a possible later selection. The supplying operation may comprise removing of the data record from the data storage comprising the plurality of data records.

It shall be noted that the plurality of data records may be stored by several separate data storage components. The method according to an embodiment of the invention is analogously applicable thereto.

It shall be also noted that according to an embodiment of the present invention, the step of supplying data to the identification means may also include providing the data to another terminal being coupled at least for a time to the original terminal, which stores the plurality of data records and which is adapted to perform the aforementioned operations. The other terminal implements the identification means used for data record provision. This embodiment may be useful in relation with various accessory types of terminal devices, for instance, a portable terminal having detachable casing parts with the identification means. Alternatively, the supplying of the selected data record to the identification means implemented in another terminal is also applicable to embodiments of the invention when there is a need to share the information comprised by the data record with other persons.

A sharing of an electronic ticket is for example applicable with an existing electronic ticket in case the electronic ticket is valid for two or more persons. Assuming that at least two of the persons will individually use the electronic ticket, a sharing and splitting of the electronic ticket is required, respectively. The portable terminal, which is adapted to share, split, pass on and/or transfer at least partly an electronic ticket to another terminal, enables that each person can obtain an electronic ticket on the basis of the existing electronic ticket. The electronic ticket may also be transferred completely between terminals such that different terminals (e.g. two different portable terminals, one for business use and one for spare time use) are applicable with the present invention.

It should be noted however, that there might be imposed restrictions on the sharing of various types of data records in order to prevent misuse. For instance payment related information (e.g. information about a credit card, a loyalty card, an electronic payment card, an electronic cash card, a debit card, a prepaid card, a coupon, a voucher, an Euro-cheque card, a vendor-specific payment card and the like) comprises confidential information. The passing on of such confidential information may allow misuse, whereas the possibility of a transfer of ticket related information is useful as mentioned above. This problem may be overcome by allowing the transfer of data which is marked as non-confidential, whereas data marked as confidential is excluded from the possibility of being shared, splitted, passed on and/or transferred.

The provision/utilization of the prepared data will be described in detail but in an abstract form with respect to the following operations. The provision/utilization shall be understood as a making available of the selected data record for being acquired by an external identification acquisition means forming a corresponding counterpart entity to the identification means employed for making available.

In an operation S170, the data record is provided/presented by the identification means, i.e. is supplied to the identification means and provided thereby for being retrieved therefrom by a corresponding identification acquisition means. The illustrated operational sequence for automated context-based selective data provision according to an embodiment of the invention may be finished now. The provision of the data record for being retrieved may be valid until a new data record is selected for being provided/presented.

Alternatively and more practical, that means that the provision of the data record may be revoked due to a certain predefined event. For instance, the provision of the data record may be limited by an interval in time defining the validity of the provision or by a retrieval event resulting in declaring the provision as being invalid. The first limitation is illustrated by operation S180, whereas the second limitation is illustrated by operation S190.

In an operation S180, the provision of the data record shall be only active during a predefined interval in time or shall only be active not exceeding a predefined moment in time. A corresponding interval in time or a moment in time defining the validity of the provision may be obtained from the provided data record, which may comprise a corresponding data item. Further, default settings may be available, which define the interval in time and a moment in time, respectively. The limitation in time is primarily applicable with digitally coded or electronic tickets represented by the presented data record. Typically, tickets are assigned to a certain validity duration in time (e.g. public transportation system) or to a certain moment in time (e.g. film show, concert, event, theatre show etc). The current time or a timer is check repeatedly and in case the limitation in time has been run out the operational sequence continues to operation S200. Otherwise, the check of the time and the timer is continued, respectively.

In an operation S190, the provision of the data record shall be revoked as soon as the data record is obtained by the corresponding counterpart identification acquisition means, for which the provision is dedicated. The identification means which is used for providing/presenting the data record is capable to detect the retrieval access of the corresponding counterpart identification acquisition retrieval means. On detection of the retrieval access the operational sequence continues to operation S200. Otherwise, the check for access detection is continued.

In an operation S200, the provision of the data record is revoked. The revoking operation may comprise a removing of the data record from the data storage comprising the one or several data records.

Alternatively, the revocation of the data record provision may be initiated by an external identification acquisition means, which is capable to modify the data record provision of the identification means. When for instance using a radio frequency identification (RFID) transponder or reader as identification means for providing the data record, the external identification acquisition means, which is for example a counterpart radio frequency identification (RFID) reader with writing capability, can modify or remove the provided data record such that the data record comprises an indication that, it has been read out and the identification means providing the data record is instructed to revoke the provision, respectively.

In an operation S210, the method for automated context-based selective data provision is finished.

The operational sequence, which is described above detailed but in abstract forms, will appear more clearly to those skilled in the art when referring to the following embodiments of the invention relating to implementational design on the basis of a portable terminal.

Figure 2:
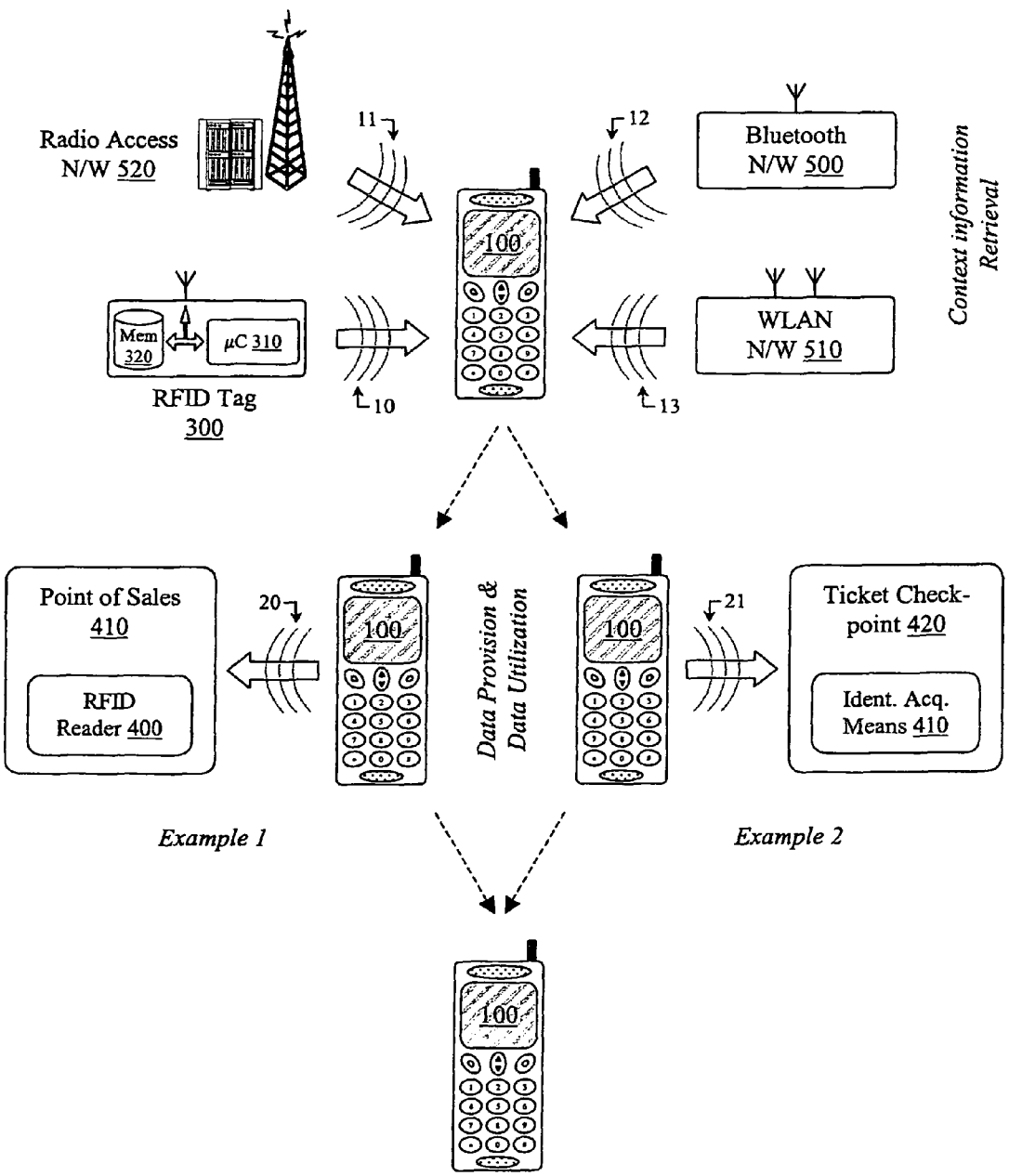
FIG. 2 schematically illustrates a time sequence diagram relating to utilization examples enabled by the method for automated context information based selective data provision according to an embodiment of the invention.

FIG. 2 schematically illustrates diagram of a sequence in time relating to utilization examples enabled by the method for automated context information based selective data provision according to an embodiment of the invention. Additionally, reference to arrangements and units involved in the performing the inventive method according to an embodiment of the invention will be given. The illustration shown in FIG. 2 comprises three sections, which first section illustrates the context-related information acquisition and which second section illustrates the data provision/utilization. In more detail, the second section includes two usage case examples, where example 1 addresses a payment procedure and example 2 relates to a ticket checkpoint procedure.

The acquisition of the context information is limited neither to any external specific context information-supplying source with context providing means nor to any context-related information acquisition means and arrangements, respectively. In view of a portable device 100 performing the above described method according to an embodiment of the invention, the context-related information shall be obtained wirelessly, which may be technically realized by wireless communication means such as cellular communication means, low power radio frequency (LPRF) communication means, identification acquisition means and infrared-based communication means.

With respect to cellular communications, the portable terminal 100 implements a cellular transceiver adapted for cellular communications with a public land mobile network (PLMN), which is for instance operable with GSM (global system for mobile communication) standard, UMTS (universal mobile telecommunications system) standard, PDC (personal digital cellular) standard, cdmaOne (IS-95) standard, cdma2000 standard, US-TDMA (15-136) standard or any other actual and future cellular communications standard, respectively.

With respect to low power radio frequency (LPRF) communications, the portable terminal 100 implements a low power radio frequency (LPRF) transceiver adapted for data communications with a wireless network. In particular portable terminal 100 implements for example a Bluetooth transceiver for communicating with Bluetooth networks (N/W) 500, a WLAN (wireless local area network) transceiver for communicating with WLAN (wireless local area network) networks (N/W) 510 or another type of transceiver capable of communication in accordance with any actual and future low power radio frequency (LPRF) communications, such as, for example Ultra Wideband (UWB) and other IEEE 802.xx standards.

With respect to identification information communications, the portable terminal 100 implements identification acquiring means adapted for obtaining information from identification providing means. In particular, the portable terminal 100 implements a radio frequency identification reader module adapted for reading information from a radio frequency identification (RFID) transponder (tag) 300. Such a radio frequency identification (RFID) transponder 300 is illustrated in more detail in FIG. 2. A typical radio frequency identification (RFID) transponder is composed of a memory component (MEM) 320 and a micro-controller (μC) 310, which accesses the memory component (MEM) 320 and is coupled to a radio frequency (RF)/high frequency (HF) interface having an antenna for receiving and transmitting radio frequency (RF) signals.

Also with respect to identification information communications, the portable terminal 100 implements alternatively a radio frequency identification reader module adapted for reading information from another radio frequency identification (RFID) reader on the basis of a reader-to-reader communication. Such a reader-to-reader communications is operable with the near field communication standard (ECMA-340).

With respect to infrared-based communications, the portable terminal 100 implements infrared-based transceiver adapted for infrared-based data communications from a counterpart device being adapted correspondingly for data communications.

Further communication means, which are not explicitly described in the present invention, may be employed for data communications. The present invention shall not be limited to any specific communication standard and means implemented in the portable terminal 100. Moreover, the acquisition of context information is not limited to communication means. Alternatively, sensor means may deliver data or signals, which are adequately used as context information, which is suitable for performing the selection operation. Such a sensor means is for example adequate to define a geographical location or just the context of the environment (by detecting for example a serving access point, which position is known). Additionally, a suitable sensor means can comprise a global positioning system means, which supplies a global positioning information corresponding to a geographical information as context information.

The portable terminal 100 comprises at least one communication means, via which the portable terminal 100 is adapted to retrieve, to receive, to request, to acquire or to obtain the context-related information. The one communication means being comprised by the portable terminal 100 may be one out of the example communication means mentioned above.

In dependence on the specific technique used for acquiring the context information, the context information is received as data, data message, data record, set of data and the like, depending in particular on the data communication transmission technology and data communication services operable therewith, respectively. In common, a communication connection link is established between the portable terminal 100 and the source providing the context information in question, between which a communication link is operable for transmitting the context information from the source to the portable terminal 100. For example, corresponding communication links 10-13 are depicted in FIG. 2. The context information acquisition is operable with unidirectional communication links allowing for transmitting the context information to the portable terminal 100. It shall be noted that bidirectional communication links may be employed but unidirectional communication links are sufficient for the inventive concept of the present invention.

Referring to cellular communications, data communications of the portable terminal 100 is operable with a radio access network (N/W) 520, which is typically constituted of at least a base station (BS) and a base station controller (BSC) and a radio network controller (RNC), respectively, and which is connected to the fixed part of the cellular network. Context information receivable via such cellular communications on a cellular data communication link 11 are formatted for instance as a (cell) broadcast message, a smart message, short message or any other information service based communication message. For example, the context information may be obtainable from a message being received in consequence of entering the coverage of a predefined base station.

Referring to identification information communications, the portable terminal 100 being for instance provided with radio frequency identification (RFID) reader capability is set into scanning mode, which causes the emission of one or more interrogation signals. Such an interrogation signal (which is a specific radio frequency signal) is received by the frequency identification (RFID) transponder, which is disposed within the coverage of the interrogation signal and which may be energized by the interrogation signal, to transmit back radio frequency signals having embedded data stored by the interrogated frequency identification (RFID)

transponder and the memory thereof, respectively. The data embedded in the radio frequency signals may serve as context information.

In analogy to the aforementioned identification information communications, the portable terminal 100 being for instance provided with a writeable identification means such as a radio frequency identification (RFID) reader according to the near field communication standard (ECMA-340) or a writeable radio frequency identification (RFID) transponder is set into writeable mode. By receiving suitable radio frequency signals from writing identification means such as a radio frequency identification (RFID) reader with writing capability, data embedded in the radio frequency signals are transmitted to the writeable identification means of the portable terminal 100 to be acquired thereby. The data embedded in the radio frequency signals may serve as context information.

Referring to low power radio frequency (LPRF) communications, data communications of the portable terminal 100 is operable with a low power radio frequency (LPRF) network, which is for instance constituted a Bluetooth network (N/W) 500 and a WLAN network (N/W) 510, respectively. Context information receivable via such low power radio frequency (LPRF) communications on a communication link 12 or 13 are formed for instance as a data packet, data message, broadcast message or any other information service based communication message. For example, the context information may be obtainable from a message being received in consequence of entering the coverage of the low power radio frequency (LPRF) network.

Independent of the communication technology used for acquiring the context information, the mobile terminal 100, which is able to perform the aforementioned method according to an embodiment of the invention, analyzes the context information and selects accordingly one data record out of the plurality of data records provided at the mobile terminal 100 for selection. The selected data record is supplied to an identification means of the portable terminal 100, i.e. the radio frequency identification (RFID) means, a visual encoding means and the like, which is now configured and prepared to allow acquisition of the presented data comprised by the data record by a corresponding counterpart identification acquisition means.

Two use cases are depicted as examples to illustrate a subsequent utilization of the selected data record prepared for provision. The first example refers to a payment procedure and the second example refers to a ticket checkpoint procedure.

With reference to the payment procedure, the provided/presented data record is retrievable by a point of sale equipment, which implements for instance a transponder reader unit 400. In accordance with radio frequency identification technology, the transponder reader unit 400 generates an interrogation signal, for reasons of which the identification means (i.e. the radio frequency identification transponder) of the portable terminal 100 transmits back the presented data record. The data record comprises any payment related information such as credit card information, loyalty card information, an electronic payment card, an electronic cash card, a debit card, a prepaid card, a coupon, a voucher, an Eurocheque card, a vendor-specific payment card etc on the basis of which the payment is conducted. After successful payment procedure it is advantageous for security issues to revoke the provision. The emitted interrogation signals of the transponder reader unit 400 activates each identification means (i.e. the radio frequency identification transponder) being disposed within the coverage of the interrogation signals. As soon as the portable terminal 100 enters the coverage, the provided data record is read-out.

With reference to the ticket checkpoint procedure, this procedure is substantially similar to that described above but uses a different identification means. The portable terminal 100 uses the visual encoding means for presenting a visual code (bar code, two-dimensional visual code, etc) corresponding to the selected data record. Herein, the display of the portable terminal 100 may be used as visual encoding means. A checkpoint 420 implements for instance an identification acquisition means 410 in the form for a visual scanning means for reading the visual code coding the selected data record. The visual scanning means may be an optical scanner. Once the holder of the portable terminal wants to pass the ticket checkpoint/gate entrance, the holder presents the visual encoding means (e.g. the built-in display) of the portable terminal 100 to the visual scanning means (e.g. the optical scanner) of the ticket checkpoint/gate entrance. The visual scanning means (which corresponds to the identification acquisition means 410) detects the visual code (e.g. the bar code or the two-dimensional visual code on the display) and reads the visual code which comprises information corresponding to the (selected and provided) data record. The information read-out by the visual scanning means of the checkpoint 420, which comprises a corresponding digitally coded or electronic ticket information, is checked for validity and access is granted in case the electronic ticket is valid. After successful ticket checking procedure the provision of the data record may be maintained or may be revoked. The maintaining of the data record provision is useful for instance in conjunction with electronic tickets for public transportation systems, where tickets are check supplementary by inspectors. The maintained provision can serve for indicating a legitimate use of a public transportation system during inspection.

Alternatively, the checkpoint 420 may be equipped with a radio frequency identification (RFID) reader unit in analogy to the point of sales described above. Continuously emitted interrogation signals may serve for activating each radio frequency identification (RFID) transponder, which is within the coverage of the interrogation signals. An activated radio frequency identification (RFID) transponder transmits its contents, i.e. herein the selected and provided data record, to the radio frequency identification (RFID) reader unit, which in turn checks the received information and grants access in case the electronic ticket is valid.

Especially in conjunction with ticketing applications, there is also a possibility of one-time tickets; that means that the electronic ticket is valid for single use e.g. a single movie ticket or bus ticket acquired from a vending machine or the like. Once the electronic ticket is provided to a corresponding checkpoint and retrieved thereby, it can be sensible to revoke immediately the electronic ticket. In view of radio frequency identification (RFID) technology, a radio frequency identification (RFID) reader implementable in a point of sales or a checkpoint may be capable for writing information to radio frequency identification (RFID) transponders. Consequently, after detecting a ticket is valid for single use the radio frequency identification (RFD) reader with writing capability transmits back one or more signals to modify the provided data record (for instance marking the data record as invalid), to erases the data record or to command to revoke the provision of the data record.

Figure 3:
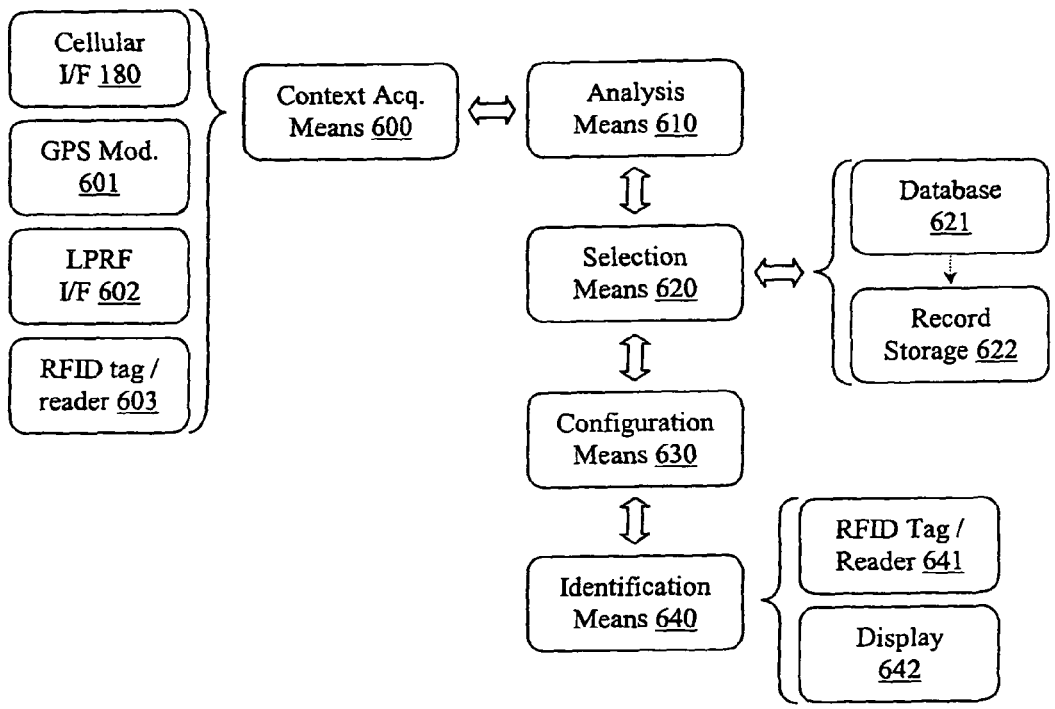
FIG. 3 schematically illustrates a block diagram of means which are adapted for realizing the method for automated context information based selective data provision according to an embodiment of the invention.

The following illustration will relate to several technical realizations of possible embodiments according to the present invention. FIG. 3 schematically illustrates a block diagram of components, means etc which are adapted for realizing the method for automates context information as described above with respect to FIG. 1 on the basis of an embodiment thereof. Amplifying references will additionally be made to FIG. 1 and FIG. 2.

FIG. 3 illustrates a context information acquisition means 600, an analysis means 610, a selection means 620, a configuration means 630 and identification means 640, the intercooperation of which allow to carry out the method according to an embodiment of the present invention. The context information acquisition means 600 shall represent several distinct means, which allow to acquire suitable context information for the final automates context-based selective data provision. In detail, the context information acquisition means 600 may be the cellular interface 180 for cellular communications, a low power radio frequency (LPRF) interface 602 such as the Bluetooth transceiver, the WLAN transceiver, the ultra wideband (UWB) transceiver and any other transceiver operable with IEEE 802.xx standards as aforementioned. Alternatively, the context information acquisition means 600 may be the radio frequency identification (RFID) transponder or reader 603 as aforementioned or may be a sensor means such as the GPS module 601 as described above. It shall be noted that the enumeration of the context information acquisition means 600 presented above is not limiting, a portable terminal operable with the present invention may be coupled internally or externally to one or more of the means illustrated above and/or may be coupled internally or externally to one or more means, which are adapted for obtaining suitable context information.

The context information acquisition means 600 is operable to obtain context information; an embodiment of the acquisition is described in detail with reference to the operations S110 to S130 illustrated in FIG. 1. The context information obtained by the context information acquisition means 600 is then supplied to the analysis means 610, which is adapted to analyze the obtained context information such as described above in detail with respect to the operation S140 of FIG. 1. On the basis of the analysis results, a data record is to be selected from a plurality of data records maintained by the portable terminal. A selection means 620 is adapted to select one data record from the plurality of data records stored by the portable terminal; an embodiment of the selection is described in detail with reference to the operations S150 illustrated in FIG. 1.

According to an embodiment of the invention, context information input from various acquisition means such asthe aforementioned low power radio frequency (LPRF) interface 602 cellular interface 180, global positioning system (GPS) module 601 RFID transponder/reader 603 etc, which is received by a dedicated software or a dedicated logic comprising the analysis means 610 and the selection means 620 coupled to e.g. an association database 621 and a data record storage 622. The association database 621 includes associations of various context information inputs with data record indications or references. That means that the indication and references constitute an association between current context information supplied and one of the stored data records. The constitution of the association is obtained by employing an adequate association algorithm. After making the association, the dedicated software or logic retrieves the selected data record associated with current context information and supplies it to a configuration means 630. The selected data record has to be prepared for the provision via the identification means 640, which is operable with the configuration means 630, which supplies the selected and prepared data record to the identification means 640.

The identification means 640 shall represent several distinct means, which allow for provision of the selected data record for being retrieved wirelessly by an external entity. In detail, the identification means 640 may be a radio frequency identification transponder/reader 641, a visual encoding means 642 for displaying for instance bar codes or related two-dimensional visual codes.

The aforementioned means comprising the analysis means 620, the selection means 630 and the configuration means 640 may represent program code sections, each including program codes, which, when carried out by a corresponding processing means such as a processor, controller and the like, perform the corresponding operations according to an embodiment of the method of the present invention as described exemplary above. Moreover, the aforementioned means comprising the analysis means 620, the selection means 630 and the configuration means 640 may represent one or more logic circuits, which are adapted to perform the corresponding operations according to an embodiment of the method of the present invention as described exemplary above.

Figure 4:
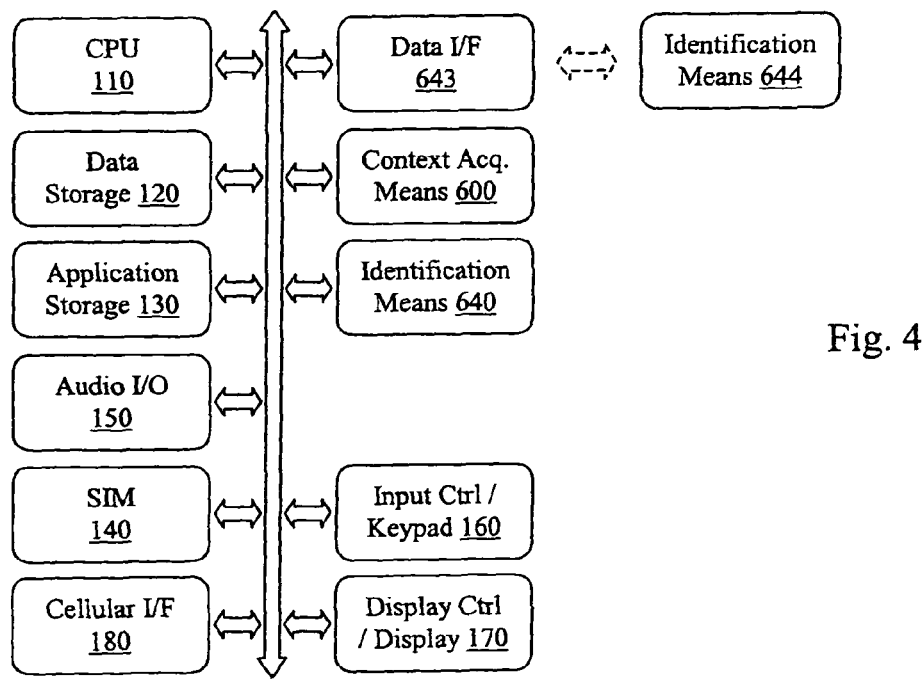
FIG. 4 schematically illustrates a mobile terminal which is adapted for realizing the method for automated context information based selective data provision according to an embodiment of the invention.

The block diagram of FIG. 4 illustrates a principle structure design of a cellular terminal as an embodiment of the portable terminal 100, which is adapted to perform the method according to an embodiment of the invention. The cellular terminal comprises typically a central processing unit 110, a data storage 120, an application storage 120 and input/output means including audio input/output (I/O) means 150, a keypad with input controller (Ctrl) 160 and a display with display controller (Ctrl) 170. A cellular interface (I/F) 180 coupled to a cellular antenna (not shown) provides an over-the-air interface, which serves in conjunction with a subscriber identification module (SIM) 140 for cellular communications with a corresponding radio access network (RAN) of a public land mobile network (PLMN) of a type such as mentioned above. The cellular terminal may further include additional invention-specific one or more components, which comprise a context information acquisition means 600, an identification means 640, a data interface 643 and an external identification means 644. It shall be noted that one or more of the invention-specific components may be identical with components of the cellular terminal. For example, the cellular interface 180 may serve as the context information acquisition means 600; the context information acquisition means 600 may serve as the data interface 643; and/or the display 170 may serve as the identification means 640.

The cellular interface (I/F) 180 is arranged as a cellular transceiver to receive signals from the cellular antenna, decodes the signals, demodulates them and also reduces them to the base band frequency. The output of the cellular interface (I/F) 180 thus consists of a stream of data that may require further processing by the CPU 110. The cellular interface (I/F) 180 arranged as a cellular transceiver also receives data from the CPU 110, which are to be transmitted via the over-the-air interface to the radio access network (RAN). Therefore, the cellular interface (I/F) 180 encodes, modulates and up converts the signals to the radio frequency, which is to be used. The cellular antenna then transmits the resulting radio frequency signals.

The display and display controller (Ctrl) 170 is controlled by the CPU 110 and provides information for the user typically by the means of a user interface. The keypad and keypad controller (Ctrl) 160 is provided to allow the user to input information. The information input via the keypad is supplied to the CPU 110, which may be controlled in accordance with the input information. The audio input/output (I/O) means 150 includes at least a speaker for reproducing an audio signal and a microphone for recording an audio signal. The CPU 110 may control the conversion of audio data to audio output signals and the conversion of audio input signals into audio data, where the audio data have a suitable format for cellular transmission.

The cellular interface 180 or alternatively a context information acquisition means 600, which may be implemented as a low power radio frequency (LPRF) interface 602, a radio frequency identification (RFID) transponder or reader, as an infrared data association (IRDA) interface as a global positioning system (GPS) module or as any other sensor means, serve for obtaining context information and contextual information, respectively.

The means, which include for instance analysis means, selection means, association database, configuration means and which are required for performing a method for automated context information selective data provision according to an embodiment of the invention, shall be implemented as an terminal application. The application comprises one or more software code sections, which when executed by the central processing unit 110 allow to perform the aforementioned method. The data record selected in accordance with the context information is finally supplied to the identification means 640 for data record provision.

Identification means 640 may be a visual encoding means for displaying a bar codes, related two-dimensional visual codes and similar codes, respectively, a radio frequency identification (RFID) transponder, reader and module, respectively, and the like.

Still another embodiment shall be presented, where the mobile terminal does not include the identification means 640. In contrast to the identification means 640 described above, the identification means used for provision of the selected data record is an external identification means 644, which is adapted to receive the data record to be provided by an adequately adapted data interface (I/F) 643. The data interface (I/F) 643 may be any data communication interface employable with cellular terminals for data communications such as a cellular interface, a low power radio frequency (LPRF) interface as described above, an infrared communication interface, a serial, parallel or proprietary interface etc. That means that the data interface (I/F) 643 may be identical with the context information acquisition means 600.

For instance, the external identification means 644 may be a dynamically alterable radio frequency identification (RFID) transponder or a radio frequency identification (RFID) reader eventually with reader-to-reader communications capability, coupled electrically or wirelessly to the cellular terminal described herein. The selected data record data is received via the data interface 643 and the radio frequency identification (RFID) transponder and a radio frequency identification (RFD) reader provides the data record received for being retrieved wirelessly respectively. The external identification means 644 may be integrated into e.g. a detachable functional cover of the cellular terminal. That means that the cover when attached to the terminal provides radio frequency identification communication functionality.

Figure 5:
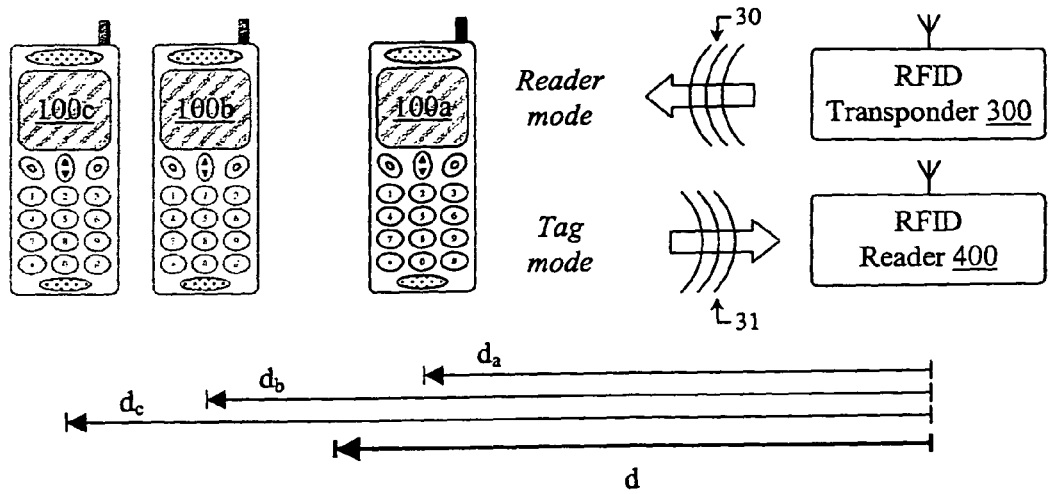
FIG. 5 schematically illustrates an arrangement of mobile terminals, wherein at least one of which implements a radio frequency identification reader with transponder emulation capability according to an embodiment of the invention.
Figure 6:
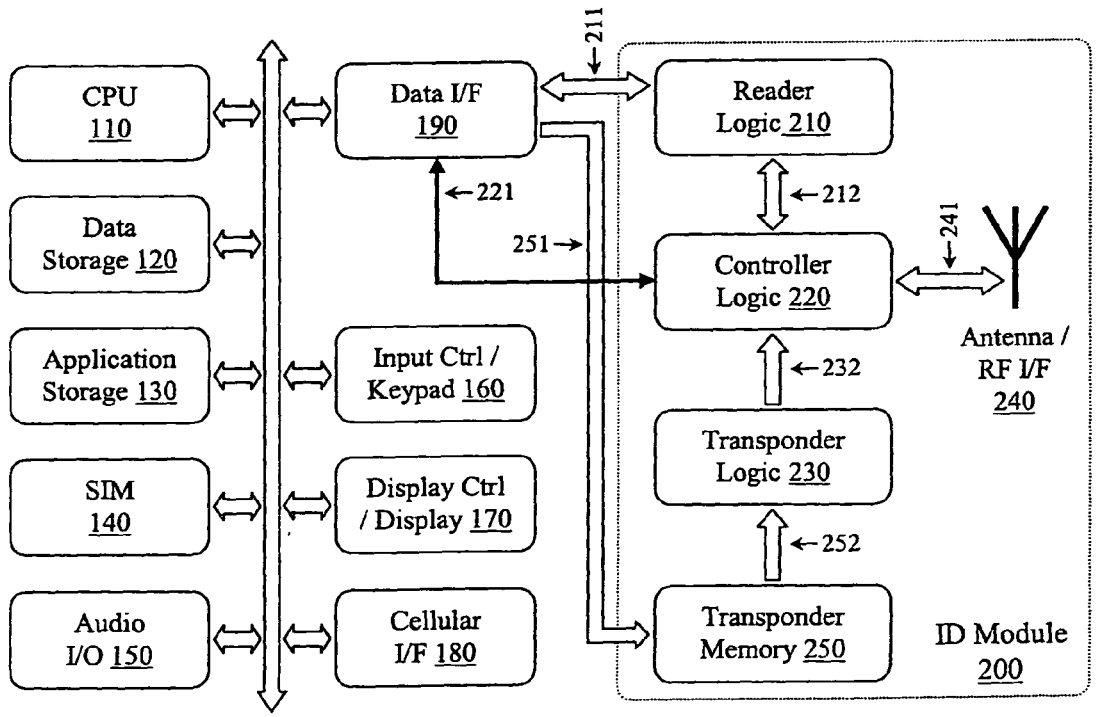
FIG. 6 schematically illustrates a detailed block diagram of a mobile terminal implementing a radio frequency identification reader with transponder emulation capability according to an embodiment of the invention.

The following embodiments illustrated in FIGS. 5 and 6 refer to a specific embodiment according to the present invention. The portable terminal 100 introduced above may be a portable phone, a personal digital assistant, a pocket personal computer, a portable personal computer, a communicator terminal or any other portable consumer electronics (CE) with processing capability and appropriate communication means; i.e. comprising at least identification means for presenting the selected data record. The following embodiment will illustrate enhanced identification means, which are for instance implementable in each of the aforementioned portable consumer electronics (CE). However, illustration of the identification means will be given with respect to a portable terminal embodied as a cellular phone, which has attached or has embedded such an identification means. But it shall be noted that the invention is not specifically limited to those identification means and to a cellular phone coupled thereto, respectively.

Referring firstly to FIG. 5, a portable terminal 100a shall provide identification means, which at least serve for provision of information retrievable by any external identification acquisition means such as a radio frequency identification (RFID) reader. That means that the portable terminal 100a comprises for example a radio frequency identification (RFID) transponder storing information. The information is obtainable by radio frequency identification (RFID) readers adapted correspondingly to the radio frequency identification (RFID) transponder. A radio frequency identification (RFID) reader activates (and if necessary energizes simultaneously) the radio frequency identification (RFID) transponder of the portable terminal 100a by an interrogation signal, on which the radio frequency identification (RFID) transponder transmits back 31 the stored information.

Information communications between identification means such as radio frequency identification (RFID) transponders and radio frequency identification (RFID) readers may be arranged to be strictly limited to a predefined communication distance. The strict limitation of the communication distance meets security aspects of the information communication between the participating identification means. That means that an information communication is possible as soon as the distance between the participating identification means falls below a predefined maximal distance, which is typically a function of power levels of the interrogation signal and/or the back-transmitted signals, respectively. The communication distance may be defined exemplary by a maximal distance d. Portable terminals such as portable terminal 100a, which is spaced at a distance $d_a$ smaller than distance d, are able to communication with respective counterpart identification acquisition means such as radio frequency identification reader 400. Portable terminals such as portable terminals 100b and 100c, which are spaced at distances $d_b$ and $d_c$ larger than distance d, are not able to communication with respective counterpart identification acquisition means such as radio frequency identification reader 400.

The limitation of the communication distance relates to several aspects, which may be summarized as security issues. The limited communication distance is applicable to prevent from accidentally and/or maliciously obtaining information stored in the identification means of the portable terminal. Assuming the maximal communication distance is selected to be in the order of centimeters, identification means exchanging information have to be such close to each other that the possibility of an accidental or a malicious information acquisition can essentially be ruled out. The limited communication distance is also applicable to prevent tapping of information exchanged between communicating identification means. Third party means, which allows tapping, ought to be as close to the communicating identification means that the tapping operation gets evident at once. The security aspects of communications between identification means is relevant when taking into consideration that payment related information shall be communication therewith. Additionally, encryption technology may be applied on the information to be exchanged to improve the communication security.

The limitation of the communication distance may be limited to such a short distance that the communicating identification means have to be placed into physical contact or nearly into physical contact. That means that the communicating identification means have to (at least almost) touch each other during the communication operation. An accidental or a malicious information acquisition and a tapping of communicated information are practically impossible, respectively.

An implementation of the portable terminal provides for identification means with identification reader functionality and transponder functionality. The transponder functionality addresses the capability for provision of information retrievable by a corresponding identification acquisition means. Referring again to radio frequency identification (RFID) technology, the transponder functionality may be realized by a radio frequency identification (RFID) transponder, which is attached to or embedded in the portable terminal. Analogously, the reader functionality may be realized by a radio frequency identification (RFID) reader, which is attached to or embedded in the portable terminal. The radio frequency identification (RFID) transponder of the portable terminal enables provision of information retrievable by corresponding radio frequency identification (RFID) readers such as the illustrated radio frequency identification (RFID) reader 400 via communication link 31, whereas the radio frequency identification (RFID) reader of the portable terminal enables information acquisition from corresponding radio frequency identification (RFID) transponders such as the illustrated radio frequency identification (RFID) transponder 300 via communication link 30.

An enhanced implementation of the portable terminal provides for identification means, which is capable for both providing information and obtaining information as described above with respect the separate implementation of identification providing means and identification acquisition means. Such an identification means is designated by a transponder mode and reader mode for serving respective functionality.

A detailed implementation of the transponder functionality and the reader functionality is embodied in FIG. 6. FIG. 6 shows a diagram of functional blocks, which allow to realize a cellular phone having an identification (ID) module 200 with the aforementioned transponder functionality and the reader functionality according to an embodiment of the present invention.

The block diagram of FIG. 6 illustrates a principle structure design of a cellular terminal, which has been described in detail with reference to FIG. 4. The embodiment of the portable terminal illustrated herein is coupled to an identification module 200, which may serve as a context acquisition means as well as identification means. The identification module 200 is operable with transponder functionality and reader functionality, respectively. The illustrated identification module 200 includes a reader logic 210, which shall represent the reader functionality, and a transponder logic 230, which shall represent the transponder functionality. Both logic units, i.e. the reader logic 210 as well as the transponder logic 230, require connection to a radio frequency (RF) interface (and a high frequency (HF) interface, respectively) and an antenna 240 adapted to the radio frequency (RF) deployed for operating. The embodiment illustrated in FIG. 6 shows a common radio frequency (RF) interface and antenna 240 used by both functional logic units 210 and 230.

In case of reader functionality, the radio frequency (RF) interface and antenna 240 is adapted to transmit one or more interrogation signals and to receive one or more response signals for retrieving information from radio frequency identification (RFID) transponders such an external radio frequency identification (RFID) transponder 300.

In case of transponder functionality the radio frequency (RF) interface antenna 240 is adequate to receive one or more interrogation signals and to transmit one or more response signals carrying information retrieved from the transponder logic 230.

The antenna is connected to the radio frequency (RF) interface, which supplies RF/HF signals generated by the radio frequency (RF) interface to the antenna and which accepts RF/HF signals received by the antenna. The radio frequency (RF) interface is responsible for both modulating and demodulating of the signals to be transmitted and received by the antenna, respectively. Therefore, the radio frequency (RF) interface and antenna 240 couples to the reader logic 210 and the transponder logic 230, respectively. In particular, the radio frequency (RF) interface receives from the transponder logic 230 signals to be modulated and transmitted. Moreover, the radio frequency (RF) interface and antenna 240 transmits demodulated signals to reader logic 210. The radio frequency (RF) interface and antenna 240 also transmits demodulated signals to the transponder logic 230 and receives signals from the transponder logic 230 to be modulated and transmitted. More particularly, the radio frequency (RF) interface provides further signals necessary for the operation of the transponder logic 230, which are in detail a power supply signal (voltage signal) and a clock signal. The power supply signal is obtained from the coupling of the interrogating electromagnetic field into the antenna, whereas the clock signal is obtained from the demodulator comprised in the radio frequency (RF) interface. The power supply signal and the clock signal are obligate for operating the transponder logic 230 in an emulation mode corresponding to a passive radio frequency identification (RFID) transponder, which is energized by interrogating signal of a radio frequency identification (RFID) tag reader module.

The identification module 200 illustrated in FIG. 6 comprises additionally a controller logic 220, which is operable to switch between the reader functionality and transponder functionality. The controller logic 220 is for instance interposed between reader logic 210, transponder logic 230 and common radio frequency (RF) interface and antenna 240. A switching input to the controller logic 220 serves for switching of the signal between reader logic 210 and transponder logic 230. In accordance with the switching function of the controller logic 220, the radio frequency (RF) interface and antenna 240 is electrically connected with the controller logic 220 via connections 241 and the controller logic 220 is electrically connected with the transponder logic 230 via connections 232 and with the reader logic 210 via connections 212.

Depending on the switching state of the controller logic 220, either the reader logic 210 or the transponder logic 230 is coupled to the common radio frequency (RF) interface and antenna 240. In the former case reader functionality is available, whereas in the latter case transponder functionality is available.

The control over the switching state may be obtained by supplying a switching signal via a switching signal connection 221 to the controller logic 220. The switching state and the switching signal connection 221 is controlled by the cellular phone, respectively, which has a suitable interface, herein data interface 190.

The reader logic 230 is coupled to an interface, herein also data interface (I/F) 190 via connections 211, to allow one or more applications operated on embodied cellular phone to communicate with the reader logic 210. The data interface (I/F) 190 interfacing between reader logic 210 and the embodied cellular phone may be established by appropriate hardware and software interfaces that allow access of the one or more applications to the reader logic 210.

Referring back to near field communication standard (ECMA-340), the purposed reader functionality and the transponder functionality as described above in view of an embodiment illustrated by functional units depicted in FIG. 6 enables to establish a further communication mode, which is additional to the standardized passive and active communication mode.

As described in detail above, the field communication standard (ECMA-340) addresses the operation of radio frequency identification (RFID) readers and defines in particular an active communication mode, which is used preferably for reader-to-reader communications, and a passive communication mode, which is preferably intended for reader-to-transponder communications. Both the active and passive communication modes require necessarily energizing of the communicating radio frequency identification (RFID) reader via a power supply. In case of the active communication mode the necessity of a power supply is obvious since communication is activated and preferably energized by the radio frequency identification (RFID) reader.

Moreover, the active as well as passive communication modes allow reading functionality and writing functionality of the radio frequency identification (RFID) reader. That means, the radio frequency identification (RFID) reader having reading functionality is adapted to retrieve information stored in one or more radio frequency identification (RFID) transponders. The reading functionality is at least the basic functionality of a radio frequency identification (RFID) reader. The radio frequency identification (RFID) reader having writing functionality is adapted to add information to radio frequency identification (RFID) transponders to be stored therein and/or to modify information stored in radio frequency identification (RFID) transponder. It shall be noted that the adding and/or modifying of information stored in radio frequency identification (RFID) transponder depends on the capability of the addressed radio frequency identification (RFID) transponder and/or an authorization of the radio frequency identification (RFID) reader for such operations.

The transponder functionality as described above in detail in view of an embodiment illustrated by functional units depicted in FIG. 6 may be employed to establish a new communication mode, which will be denoted as show communication mode. In the show communication mode the transponder functionality is switched while the reader functionality is out of operation. The show communication mode is distinguished from the known communication modes therein that the transponder functionality provides the physical advantages of a passive radio frequency identification (RFID) transponder, which does not require any internal power supply. This is in clear contrast to the passive communication mode, which may be regarded as a functionality, which simulates a radio frequency identification (RFID) transponder. This essential advantage will become more intellectual in view of the operation examples, which are presented below.

For transponder functionality, an adequate transponder memory 250 stores the information, which is retrievable by a radio frequency identification (RFID) reader such as the external radio frequency identification (RFID) reader 400. Herein, transponder memory 250 is connected to transponder logic 230 via connections 252 and is a configurable memory. Various storage technologies are available to implement a configurable memory and in particular non-volatile configurable storage technologies are applicable therefor. The configurable transponder memory 250 is under control of the cellular phone. Therefore, the configurable transponder memory 250 coupled for example also to the data interface (I/F) 190 via connections 251 to allow one or more applications operated on the cellular phone to configure the contents of the transponder memory 250. The coupling of the cellular phone and the configurable transponder memory can alternatively be realized by another data interface. The data interface (I/F) 190 interfacing between configurable transponder memory 250 and the cellular phone may be established by appropriate hardware and software interfaces that allow the configuration access of the one or more applications to the transponder memory 250.

The illustrated identification module 200 as embodied in FIG. 6 may be attached to or embedded in an embodied cellular phone. The identification module 200 may be provided with an interface such as a serial interface interfacing data exchanged between the identification module 200 and the embodied cellular phone via data interface (I/F) 190. Applications executed on the embodied cellular phone can use the functionality of the identification module 200. An application program interface (API) layer may support the communication between applications and the identification module 200.

It shall be noted that the embodiment of the identification module 200 shown in FIG. 6 illustrates one possible embodiment thereof. The depicted (logic and memory) units shall represent functional units. Those skilled in the art will appreciate on the basis of the description given above that the functional units may be composed in another way while still allowing the functionality of the identification module.

In order to described the application of the illustrated identification (ID) module 200 in conjunction with the inventive methodology according to an embodiment of the invention, an operation example referring to the operational sequence of FIG. 1 will be given.

With reference to the retrieval of context information, the identification module 200 is operated in the reader mode; i.e. the reader functionality of the identification module 200 is used. During operation in the reader mode, the identification module 200 may emit continuously or repeatedly interrogation signals in order to detect radio frequency identification (RFID) transponders, which are activated and if necessary energized by the interrogation signals, respectively. In case an external radio frequency identification (RFID) transponder such as the external radio frequency identification (RFID) transponder 300 is within the communication distance d of the identification module 200 operated in the reader mode, the context information stored in the external radio frequency identification (RFID) transponder is retrieved therefrom. Afterwards the retrieved context information is analyzed such that the selection is operable with the retrieved context information as described with respect to FIG. 1.

With reference to the data preparation, the selected data record is prepared for provision. The preparation of the selected data record comprises a configuration of the identification module 200 to enable the provision via its radio frequency front-end such that the selected data record can be retrieved by an external radio frequency identification (RFID) reader such as the external radio frequency identification (RFID) reader 400.

In one embodiment of the present invention, the plurality of data records is stored in the transponder memory 250. The selecting the data record corresponds to a configuring of the transponder memory 250 and the transponder logic 230 in such a way that the selected data record is presented via the radio frequency front-end of the identification module 200, whereas the not selected data records remain hidden. The hidden data records are not retrievable by any external radio frequency identification (RFID) reader.

In another embodiment of the present invention, the plurality of data records may be stored in any storage component of the portable terminal such as the illustrated cellular phone, which storage components include the data storage 120, the subscriber identification module (SIM), the transponder memory 250 and any other storage component (not shown) coupled to the cellular phone and accessible thereby for storing and retrieving data. With selection of the data record, the data record is retrieved from its storage place and supplied to the transponder logic 230 and the transponder memory 250, respectively.

As once as the selected data record is prepared for provision, i.e. as once as the data record is selected, retrieved from its storage position and supplied to the transponder logic 230 and the transponder memory 250 of the identification module 200, respectively, the operation mode of the identification module 200 is switched automatically from the reader mode to the transponder mode. The switching is performed automatic with the supplying of the selected data record to the transponder logic 230 and the transponder memory 250, respectively.

With reference to the data provision, transponder mode for operating the identification module 200 is maintained during the provision of the selected data record, which is now obtainable by any external radio frequency identification (RFID) reader such as the external radio frequency identification (RFID) reader 400. AS soon as the provision of the selected data record is revoked, the data record may be removed from the transponder logic 230 and the transponder memory 250, respectively. Alternatively, the transponder memory 250 and the transponder logic 230 are configured to hide to data record presented up to now, respectively. The operation mode of the identification module 200 shall be automatically switched from transponder mode to reader mode, which results also in a revocation of the provision of the selected data record to external radio frequency identification (RFID) readers.

Usage Cases

Finally, a selection of example usage cases shall be described provide a further understanding of the invention.

(a) Case 1:

A spatial defined area is covered by the coverage of specific wireless network including for instance a cellular network, a WLAN network and a Bluetooth network. In case a user who has a portable terminal according to an embodiment of the invention enters the spatial defined area receives a message of welcome transmitted to the portable terminal as a push message. The welcoming message may inform the user that he has entered the converge of the wireless network. Such spatial defined areas with wireless communications services may be operated by warehouses, shopping malls, airports, railway, stations, stadiums, cinemas, event halls and the like.

The received message of welcome corresponds to a context information described above. The message of welcome is analyzed to allow selecting of a data record. The context information comprising for instance an identifier of the sender can be employed to select a data record, which relates for instance to a loyalty card information of the ware house, shopping mall, airline, etc. Further, the context information can be employed to select a data record, which relates to a payment card information of the warehouse, shopping mal, etc. And finally, the context information can be employed to select a data record, which relates to a ticket information of for a flight, for a train, for an event, for a sports event, for a film show, etc.

With respect a cellular network, the spatial defined area can be covered by one or more specific cells of the cellular networks and the welcoming message can be pushed to portable terminals within the spatial defined area by cell broadcast services. Such a specific implementation of cellular networks is operated for instance at airports to provide additional information services to the passengers.

(b) Case 2:

The entrance areas of a spatial defined area can be equipped with identification means such as radio frequency identification (RFID) transponders, which provide context information to be retrievable by each customer passing the identification means arranged in the entrance areas.

The information, which can be retrieved from the identification means at the entrance areas, corresponds to a context information described above. The context information is analyzed to allow selecting of a data record. The context information can be employed to select a data record, which relates for instance to a loyalty card information of the ware house, shopping mall, airline, etc. Further, the context information can be employed to select a data record, which relates to a payment card information of the warehouse, shopping mal, etc. And finally, the context information can be employed to select a data record, which relates to a ticket information of for a flight, for a train, for an event, for a sports event, for a film show, etc.

A related usage case can be used in public transportation systems, gateways, cinemas, theatres and facilities and institutions with access checking. In the area of an access checkpoint and ticket checkpoint, identification means such as radio frequency identification (RFID) transponders are provided, which provide context information to be retrievable by each person passing the identification means and moving towards the access checkpoint and ticket checkpoint, respectively. The context information provided by such identification means are dedicated for instructing a portable terminal carried by a passing person to present a corresponding data record; i.e. a data record comprising for instance ticket information for the following ticket check and/or identification information for the following access check. The advanced provision of context information, which is suitable for configuring the provision of the corresponding data record, is adequate to speed up the following checking procedure. The identification means are preferably installed in areas, within which queues are forming.

Whereas the current example usage case has been described in view of identification technology such as radio frequency identification (RFID) technology, it is immediately understood on the basis of the given description by those skilled in the art that such context information as aforementioned can also be provided by other communication technologies, which comprise for instance low power radio frequency technology (Bluetooth and WLAN techniques), infrared communication technology etc.

(c) Case 3:

Specific identification means arranged at distinct predefined positions may be employed for providing context information. Shops, warehouses etc provide near the entrance or near the cash box information about accepted payment options for instance comprising which kind of credit cards and/or payment cards are accepted. Such information is typically indicated in from of adhesive labels carrying a logo, which is advisory of the kind of accepted payment card or credit card. The adhesive labels can be provided with radio frequency identification (RFID) transponders, preferably of passive type, to contain context information. A customer, who wants to pay his selected goods, wares etc obtains the context information from the radio frequency identification (RFID) transponder embedded into an adequate adhesive label. On the basis of the context information stored in the radio frequency identification (RFID) transponder of the adhesive label one or more instructions are extracted from the context information, which effect a selection of a data record that corresponds to the adequate adhesive label.

For instance, an adhesive label with a logo of a distinct credit card organization is equipped with context information comprising instructions to select, supply and present a data record e.g. via the radio frequency front-end of the identification module operated in transponder mode. Corresponding identification means (e.g. a radio frequency identification (RFID) reader) included in a cash box are able to obtain the presented data record comprising the credit card information corresponding to the distinct credit card organization identified by the adhesive label with the logo thereof.

The aforementioned procedure can also be performed in a staggered operation. Firstly, a customer retrieves context information from a radio frequency identification (RFID) transponder, which is provided with a logo of a shop, warehouse etc, which context information includes one or more instructions to allow selecting, supplying and presenting a data record, which relates to a loyalty card information. The data record relating to the loyalty card information is retrievable by cash box. Afterwards, the customer retrieves context information from a radio frequency identification (RFID) transponder, which is provided with a logo of a credit card organization, bank etc, which context information includes one or more instructions to allow selecting, supplying and presenting a data record, which relates to a credit card information, payment information etc. In turn, the data record relating to the credit card information, payment information etc is retrievable by cash box.

(d) Case 4:

An automated vending machine or an automated ticket machine may be used by a customer for purchasing a digital ticket and for acquiring a data record, which relates to information including the digital ticket. Such vending and ticket machines are employed for public transportation systems, cinemas, flight tickets etc. The procedure of acquiring the data record is out of the scope of the present invention. But in case that the ticket will be used directly after the purchase, the vending and ticket machine can be equipped with identification means to provide context information on the basis of which the data record relating to the digital ticket is selected, supplied and presented.

In an enhanced use case a bus stop or a stop of any other public transportation system may be equipped with an automated ticket machine, where a customer is able to obtain a (bus) ticket for the planned trip. In order to ease the vending procedure, the customers just selects a destination on a bus stop map and points the destination with the portable terminal. By pointing the destination with the portable terminal the customer approximates its portable terminal to the destination bus stop indication on the bus stop map which is equipped, where each bus stop indication is provided with radio frequency identification (RFID) transponders, each of which coding the individual bus stop, to which it is associated. The information coding the destination bus stop is identified by the portable terminal as such that the portable terminal automatically provides a corresponding vending request to the automated ticket machine. On the basis of the provided information, the automated ticket machine issues a corresponding bus ticket valid for a trip to the pointed destination bus stop.

The different usage cases have been presented to improve the understanding of the concept of the present invention. Nevertheless, it has been shown that the context information, on the basis of which the provision of a selected data record is performed, can have different appearances and contents. Independent of the appearances and contents of the context information, the association) between context information and data record to be selected may be principally grouped as following:

(a) Instructed Selection

The context information comprises one or more specific instructions, which are suitable to identify directly one data record out of the plurality of data records provided. Such an instructed selection is primarily applicable with use case 3.

(b) Selection by Comparison

Context information comprises several information items, which are matched with the data items comprised in the data records. In case of significant matching, a data record with the matching data item is selected from the plurality of data records provided. Such a selection by comparison is operable for instance with a welcoming message comprising a sender identification, which is also contained by a data item of the selected data record (cf. use case 1).

(c) Selection by Association

Different context information or information items comprised by the context information are each associated with predefined data records provided. The association information can be included in the data records or can be maintained in an additionally provided association list. In analogy with the selection by comparison by association, the context information or an information item is compared with the association information. In case of significant matching, a data record in accordance with the association is selected from the plurality of data records provided.

The set of association list each list item associating a specific context information with a data record is especially applicable for dynamic teaching of the association between acquired context information and data records. That means that a location information to be employed as context information is firstly not suitable for selecting a particular data record. But, when the user indicates for a first time that the location information shall refer to a particular data record, later acquisition of such a location information automatically results in a correct selection and provision of the particular data record. This teaching method is applicable to any information being connected with a certain context.

It will be obvious for those skilled in the art that as the technology advances, the inventive concept can be implemented in a broad number of ways. The invention and its embodiments are thus not limited to the examples described above but may vary within the scope of the claims.

The invention claimed is:

1. A method, comprising:
receiving, at an apparatus, context information from an external source;
selecting, at said apparatus, a data record out of a plurality of data records, wherein said plurality of data records are maintained within said apparatus, wherein said selecting of said data record is performed in accordance with said received context information;
supplying said selected data record to a radio frequency identification communication module within said apparatus; and providing said selected data record as an identification information by said radio frequency identification communication module for being retrievable wirelessly by an external entity through radio frequency identification interrogation.

2. The method according to claim 1, comprising scanning an environment of said apparatus to determine a presence of said external source.

3. The method according to claim 1, further comprising analyzing, at said apparatus, said received context information for selecting said data record.

4. The method according to claim 3, wherein said analyzing comprises at least one operation out of:
    extracting, at said apparatus, from said received context information one or more commands instructing to select said data record;
    extracting, at said apparatus, an information item from said context information to be compared with data items comprised by said data records in order to allow for selecting said data record; and
    extracting, at said apparatus, an information item from said context information to be compared with association information in order to allow for selecting said data record.

5. The method according to claim 1, wherein each of said data records relates to at least one out of a group including payment related information, loyalty card related information, credit card related information, a debit card related information, a prepaid card related information, a coupon related information, a voucher related information, and electronic ticket related information.

6. The method according to claim 1, wherein said supplying of said selected data record to said radio frequency identification communication module further comprises:
    configuring, at said apparatus, said radio frequency identification communication module with said selected data record for providing said selected data record by said radio frequency identification communication module provided as said identification information.

7. The method according to claim 1, wherein said providing of said selected data record by said radio frequency identification communication module allows for wirelessly retrieving by a corresponding external counterpart radio frequency identification communication module of said external entity.

8. The method according to claim 1, further comprising:
    revoking, at said apparatus, said provision of said selected data record in consequence of at least one operation out of a set of operations including:
    running down, at said apparatus, a predefined interval in time;
    exceeding, at said apparatus, a predefined moment in time; and
    detecting, at said apparatus, whether said external entity has retrieved said selected data record provided as identification information from said radio frequency identification communication module.

9. The method according to claim 1, wherein said radio frequency identification communication module is operable with a reader mode and a transponder mode, said method further comprising:
    operating said radio frequency identification communication module in said reader mode for said acquisition of said context information; and
    operating said radio frequency identification communication module in said transponder mode for provision of said selected data record.

10. The method according to claim 1, wherein said context information includes at least one of location information, an interval in time, a current time, an instruction identifying a specific data record of said plurality of data records, and an identification of said external source.

11. A computer-readable storage medium having computer-executable program code sections stored thereon for carrying out a method when said program code sections are run on an apparatus including at least one of a computer, a microprocessor based device, a terminal, a network device, a mobile terminal or a mobile communication enabled terminal, said method comprising:
    receiving context information from an external source;
    selecting a data record out of a plurality of data records, wherein said plurality of data records are maintained within said apparatus, wherein said selecting of said data record is performed in accordance with said received context information;
    supplying said selected data record to a radio frequency identification communication module within said apparatus; and
    providing said selected data record as an identification information by said radio frequency identification communication module for being retrievable wirelessly by an external entity through radio frequency identification interrogation.

12. An apparatus, comprising:
    radio frequency interface configured for receiving context information from an external source;
    selection means configured for selecting a data record out of a plurality of data records, wherein said plurality of data records is maintained by the apparatus for selection, wherein said selecting of said data record is operable in accordance with said context information; and
    configuration means configured for supplying said selected data record to a radio frequency identification communication module within said apparatus;
    wherein said radio frequency identification communication module is configured for providing said selected data record as an identification information for being wirelessly retrievable by an external entity through radio frequency identification interrogation.

13. The apparatus according to claim 12, wherein said radio frequency interface is further configured for scanning an environment of said apparatus in order to determine a presence of said external source.

14. The apparatus according to claim 12, wherein said radio frequency identification communication module is coupled electrically or wirelessly to said apparatus at least for a time.

15. The apparatus according to claim 12, further comprising:
    analysis means configured for analyzing said received context information, wherein said apparatus further comprises at least one means out of:
        extraction means configured for extracting from said received context information one or more commands and/or for extracting an information item from said context information, wherein said one or more commands instruct to select said data record; and
        comparison means configured for comparing said information item with data items comprised by said data records and/or for comparing said information item with association information such that the selection is operable with comparison results.

16. The apparatus according to claim 12, further comprising:
> revocation means configured for revoking said provision of said selected data record by said radio frequency identification communication module in consequence of a signal generated by at least one means out of:
> > timer means configured to generate said signal in case a predefined interval in time has run down and/or in case a predefined moment in time has been exceeded; and
> > detection means configured to detect whether said external entity has retrieved said selected data record provided as said identification information from said radio frequency identification communication module.

17. The apparatus according to claim 12, wherein said radio frequency identification communication module is operable with a reader mode and a transponder mode; wherein said radio frequency identification communication module is operable with said reader mode for acquiring context information, wherein said radio frequency identification communication module is operable with said transponder mode for providing said selected data record as said identification information.

18. The apparatus according to claim 12, wherein at least one of said means is implemented on the basis of a code section, which is configured to perform a function of said means, when carried out by a processing means comprised by said apparatus.

19. The apparatus according to claim 12, wherein said context information includes at least one of location information, an interval in time, a current time, an instruction identifying a specific data record of said plurality of data records, and an identification of said external source.

* * * * *